United States Patent
Nomura

(12) 
(10) Patent No.: US 11,021,594 B2
(45) Date of Patent: Jun. 1, 2021

(54) METHOD FOR MANUFACTURING WET RUBBER MASTERBATCH

(71) Applicant: Toyo Tire Corporation, Itami (JP)

(72) Inventor: Kenji Nomura, Itami (JP)

(73) Assignee: TOYO TIRE CORPORATION, Itami (JP)

(*) Notice: Subject to any disclaimer, the term of this patent is extended or adjusted under 35 U.S.C. 154(b) by 0 days.

(21) Appl. No.: 16/696,251

(22) Filed: Nov. 26, 2019

(65) Prior Publication Data

US 2020/0172711 A1    Jun. 4, 2020

(30) Foreign Application Priority Data

Nov. 30, 2018 (JP) .............................. JP2018-224492

(51) Int. Cl.
| | | |
|---|---|---|
| *C08L 7/02* | (2006.01) | |
| *C08J 3/22* | (2006.01) | |
| *C08K 3/04* | (2006.01) | |

(52) U.S. Cl.
CPC ................ *C08L 7/02* (2013.01); *C08J 3/226* (2013.01); *C08K 3/04* (2013.01); *C08L 2201/52* (2013.01); *C08L 2310/00* (2013.01)

(58) Field of Classification Search
CPC .... C08L 7/02; C08L 2310/00; C08L 2201/52; C08J 3/226; C08K 3/04
See application file for complete search history.

(56) References Cited

U.S. PATENT DOCUMENTS

2017/0152353 A1*  6/2017  Nishimura ............ B29B 7/7495

FOREIGN PATENT DOCUMENTS

| JP | 2016-3316 A | 1/2016 |
|---|---|---|
| JP | 2016-94501 A | 5/2016 |
| JP | 2016-141720 A | 8/2016 |

* cited by examiner

*Primary Examiner* — Robert D Harlan
(74) *Attorney, Agent, or Firm* — Westerman, Hattori, Daniels & Adrian, LLP

(57) ABSTRACT

A method for manufacturing wet rubber masterbatch obtained from raw materials in the form of at least filler, dispersion solvent, and rubber latex solution, includes an operation in which the rubber latex solution is mixed and coagulated with a slurry solution containing the filler and the dispersion solvent to manufacture a filler-containing rubber coagulum; and a heating operation in which a single-screw extruder is used to carry out dewatering, drying, and plasticization of the filler-containing rubber coagulum in a single operation. The method satisfies conditions: $0.02 \leq C/(A \times B) \leq 0.15$, where A indicates, for a portion of the screw which is located at the dewatering portion, the pitch volume ($mm^3$), B indicates rotational speed (rpm) of the screw, and C indicates feed volume per minute ($mm^3/min$) of the filler-containing rubber coagulum which is fed into the single-screw extruder.

1 Claim, 2 Drawing Sheets

METHOD FOR MANUFACTURING WET RUBBER MASTERBATCH

TECHNICAL FIELD

The present invention relates to a method for manufacturing a wet rubber masterbatch.

BACKGROUND ART

Use of wet rubber masterbatch to improve filler dispersion characteristics and/or workability during manufacture of a rubber composition containing carbon black or other such filler has been known conventionally in the rubber industry. This involves causing filler and dispersion solvent to be mixed together in advance in a given ratio, causing rubber latex solution and a filler-containing slurry solution in which filler has been dispersed by means of mechanical force within dispersion solvent to be mixed together while in liquid phase, thereafter adding acid or other such coagulant, and collecting and drying the coagulum. As compared with use of dry rubber masterbatch obtained by causing filler and rubber to be mixed together while in solid phase, use of wet rubber masterbatch makes it possible to obtain a rubber composition having excellent filler dispersion characteristics and also having excellent workability as well as reinforceability and other such rubber properties. By using such a rubber composition as raw material, it is for example possible to manufacture rubber products such as pneumatic tires having reduced rolling resistance and excellent fatigue resistance capability.

In the context of the aforementioned method for manufacturing a wet rubber masterbatch, as method for causing water originating from the rubber latex solution and the dispersion solvent to be removed from the filler-containing rubber coagulum that is obtained following the coagulation operation, a method in which solid-liquid separation is carried out as a result of employment of filtration and/or centrifugal separation, following which any desired mixer is employed to carry out dewatering and kneading as the filler-containing rubber coagulum is heated, may for example be cited. With such a dewatering method, the greater the number of operations in which dewatering, drying, plasticization, and so forth are carried out, and the higher the heating temperature which is employed during kneading, the more it will be possible to reduce the fractional water content of the wet rubber masterbatch obtained following dewatering. However, as the number of operations in which dewatering, drying, plasticization, and so forth are carried out, and the amount of heat and/or mechanical energy applied during dewatering, are increased, this will cause cleavage and so forth of polymer molecular chains in the wet rubber masterbatch that is obtained, as a result of which there may be worsening of the vulcanized rubber properties of the rubber composition that is ultimately obtained. Accordingly, the reality is that there is room for adoption of many stratagems during operations in which dewatering, drying, plasticization, and so forth are carried out in the context of a method for manufacturing wet rubber masterbatch.

Patent Reference No. 1 for example describes art in which a twin-screw extruder is used when carrying out dewatering/drying of a filler-containing rubber coagulum. Furthermore, Patent Reference Nos. 2 and 3 describe art in which single-screw extruders are used.

PRIOR ART REFERENCES

Patent References

PATENT REFERENCE NO. 1: Japanese Patent Application Publication Kokai No. 2016-141720
PATENT REFERENCE NO. 2: Japanese Patent Application Publication Kokai No. 2016-3316
PATENT REFERENCE NO. 3: Japanese Patent Application Publication Kokai No. 2016-94501

SUMMARY OF INVENTION

Problem to be Solved by Invention

But as a result of intensive study by the present inventor(s) it was discovered that by improving dewatering conditions in the context of art employing single-screw extruder(s) such as is described at the foregoing patent references, there is room for achieving further improvement in rubber properties.

The present invention was conceived in light of such situation, it being an object thereof to provide a method for manufacturing a wet rubber masterbatch that permits attainment of vulcanized rubber having excellent antiscorching characteristics and reduced heat generation.

Means for Solving Problem

The present invention relates to a method for manufacturing wet rubber masterbatch obtained from raw materials in the form of at least filler, dispersion solvent, and rubber latex solution, comprising an operation in which the rubber latex solution is mixed and coagulated with a slurry solution containing the filler and the dispersion solvent to manufacture a filler-containing rubber coagulum; and a heating operation in which a single-screw extruder is used to carry out dewatering, drying, and plasticization of the filler-containing rubber coagulum in a single operation; wherein the single-screw extruder has a dewatering portion toward a side thereof from which the filler-containing rubber coagulum is fed, a drying portion toward a side thereof from which the filler-containing rubber coagulum is discharged, and a screw that passes through said dewatering portion and said drying portion; wherein the screw has a plurality of peaks and a plurality of troughs; wherein the dewatering portion has an inside wall that faces the screw, and is equipped with a barrel that houses the screw; and wherein the method for manufacturing wet rubber masterbatch is characterized in that it satisfies conditions indicated by General Formula (1): $0.02 \leq C/(A \times B) \leq 0.15$ (at General Formula (1), A indicates, for a portion of the screw which is located at the dewatering portion, the pitch volume ($mm^3$) which is the volume swept by a region corresponding to one pitch length from the downstream-most peak in the direction in which the filler-containing rubber coagulum is extruded to the peak that is adjacent to said downstream-most peak, and the clearance from the base of the trough of the screw which is present at said region corresponding to one pitch length to the inside wall of the barrel, during one rotation of the screw; B indicates rotational speed (rpm) of the screw; and C indicates feed volume per minute ($mm^3/min$) of the filler-containing rubber coagulum which is fed into the single-screw extruder).

Benefit of Invention

While some of the details concerning mechanisms of action in connection with benefits of wet rubber masterbatch manufacturing methods associated with the present invention are unclear, it is speculated as follows. Note, however, that except where otherwise indicated such mechanisms of action should not be interpreted in such fashion as to limit the scope of the present invention.

As at the foregoing Patent Reference Nos. 2 and 3, the method for manufacturing wet rubber masterbatch of the present invention is a method for manufacturing wet rubber masterbatch obtained from raw materials in the form of at least filler, dispersion solvent, and rubber latex solution, and comprises an operation in which the rubber latex solution is mixed and coagulated with a slurry solution containing the filler and the dispersion solvent to manufacture a filler-containing rubber coagulum, and a heating operation in which a single-screw extruder is used to carry out dewatering, drying, and plasticization of the filler-containing rubber coagulum in a single operation. Furthermore, the foregoing single-screw extruder has a dewatering portion toward a side thereof from which the foregoing filler-containing rubber coagulum is fed, a drying portion toward a side thereof from which the foregoing filler-containing rubber coagulum is discharged, and a screw that passes through said dewatering portion and said drying portion; the foregoing screw has a plurality of peaks and a plurality of troughs; the foregoing dewatering portion has an inside wall that faces the foregoing screw; and the single-screw extruder is equipped with barrel(s) that house the foregoing screw. As a result of use of such a single-screw extruder, because dewatering, drying, and plasticization of the foregoing filler-containing rubber coagulum can be carried out in a single operation, it is possible to suppress rubber deterioration and to manufacture a wet rubber masterbatch for which rubber properties, particularly rubber strength, are excellent.

Moreover, a method for manufacturing wet rubber masterbatch in accordance with the present invention satisfies the conditions indicated by General Formula (1): $0.02 \leq C/(A \times B) \leq 0.15$ (at General Formula (1), A indicates, for a portion of the screw which is located at the foregoing dewatering portion, the pitch volume (mm$^3$) which is the volume swept by a region corresponding to one pitch length from the downstream-most peak in the direction in which the foregoing filler-containing rubber coagulum is extruded to the peak that is adjacent to said downstream-most peak, and the clearance from the base of the trough of the foregoing screw which is present at said region corresponding to one pitch length to the foregoing inside wall of the foregoing barrel, during one rotation of the foregoing screw; B indicates the rotational speed (rpm) of the foregoing screw; and C indicates feed volume per minute (mm$^3$/min) of the foregoing filler-containing rubber coagulum which is fed into the foregoing single-screw extruder). While there is in general a large amount of filler-containing rubber coagulum that is fed to the screw of a single-screw extruder, because said rubber coagulum is strongly compressed at the dewatering portion, it is thought to be compacted and easily dewatered. However, it was learned that when a large amount of said rubber coagulum is fed thereinto, despite the fact that said rubber coagulum is subjected to compression, there being inadequate room at the dewatering portion for escape of the water from said rubber coagulum which is produced as a result of compaction, there is a reduction in the amount of water that is discharged from the dewatering portion, which is to say that there is an increase in the water content of said rubber coagulum as it is fed into the drying portion. In particular, at the portion of the screw which is located in the dewatering portion, the foregoing problem will be quite striking in a region corresponding to one pitch length (region between mutually adjacent peaks of the screw) which is located downstream-most in the direction in which said rubber coagulum is extruded, because this is where said rubber coagulum will be the most compressed within the dewatering portion. Furthermore, when the amount of filler-containing rubber coagulum that is fed to a single-screw extruder is small, because said rubber coagulum will be subjected to excessive heat at the dewatering portion, as reduction of water content due to drying is more striking than that that due to compaction, there will be occurrence of rubber deterioration. On the other hand, by causing the volume of a space present in a region corresponding to one pitch length which is located downstream-most in the direction in which said rubber coagulum is extruded at a portion of a screw which is located at a dewatering portion and the amount of the foregoing filler-containing rubber coagulum which is fed thereinto to be in a prescribed relationship as indicated at the foregoing General Formula (1), methods for manufacturing wet rubber masterbatch in accordance with the present invention optimize dewatering conditions and make it possible to obtain a wet rubber masterbatch that permits attainment of vulcanized rubber having excellent antiscorching characteristics and reduced heat generation.

EMBODIMENTS FOR CARRYING OUT INVENTION

Figure 1:
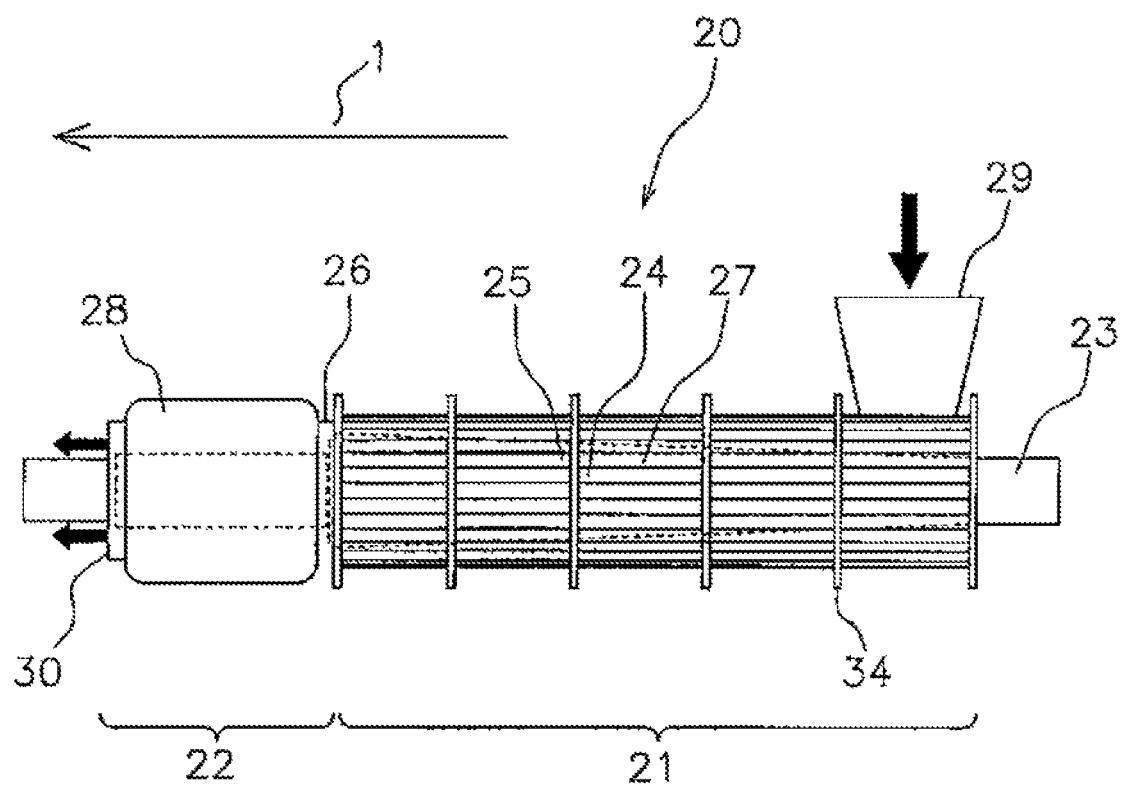
FIG. 1 Exemplary external appearance of single-screw extruder capable of being used in accordance with the present invention.

The method for manufacturing wet rubber masterbatch of the present invention is a method for manufacturing wet rubber masterbatch obtained from raw materials in the form of at least filler, dispersion solvent, and rubber latex solution, and comprises an operation in which the rubber latex solution is mixed and coagulated with a slurry solution containing the filler and the dispersion solvent to manufacture a filler-containing rubber coagulum, and a heating operation in which a single-screw extruder is used to carry out dewatering, drying, and plasticization of the filler-containing rubber coagulum in a single operation.

Operation in which Filler-Containing Rubber Coagulum is Manufactured

The operation in which filler-containing rubber coagulum in accordance with the present invention is manufactured is such that, as has been carried out heretofore, rubber latex solution is mixed and coagulated with a slurry solution containing filler and dispersion solvent to manufacture filler-containing rubber coagulum.

As the foregoing filler, carbon black, silica, clay, talc, calcium carbonate, magnesium carbonate, aluminum hydroxide, and other such inorganic fillers ordinarily used in the rubber industry may be cited as examples. Among the foregoing inorganic fillers, carbon black may in particular be favorably employed in the context of the present invention.

As examples of the foregoing carbon black, besides SAF, ISAF, HAF, FEF, GPF, and other such carbon blacks ordinarily used in the rubber industry, acetylene black, Ketchen black, and/or other such electrically conductive carbon blacks may be used. The carbon black may be nongranulated carbon black or may be granulated carbon black that has been granulated based upon considerations related to the handling characteristics thereof as is ordinary practice in the rubber industry. Any one species of carbon black may be used alone, or two or more species thereof may be employed in combination.

As the foregoing dispersion solvent, while water is preferred, water which may for example contain organic solvent may also be used.

As the foregoing rubber latex solution, natural rubber latex solution and/or synthetic rubber latex solution may be used.

As the foregoing natural rubber latex solution, it is preferred that the natural rubber be natural product(s) of plant metabolism, and in particular that the dispersion solvent be water, such that the natural rubber latex solution is a natural rubber/water system. The number average molecular weight of natural rubber within the natural rubber latex used in the context of the present invention is preferably not less than 2,000,000, and is more preferably not less than 2,500,000. Furthermore, as the natural rubber latex solution, latex concentrate, fresh latex such as that which is referred to as "field latex," or any other such latex may be used without distinction. As synthetic rubber latex solution, these include for example those such as may be manufactured by emulsion polymerization of styrene-butadiene rubber, butadiene rubber, nitrile rubber, and/or chloroprene rubber. As the foregoing rubber latex solution, any one species may be used alone, or two or more species may be employed in combination.

The description that follows is given in terms of a preferred example of a coagulation operation in which carbon black is employed as an example of filler, and natural rubber latex solution is employed as an example of rubber latex solution. In such case, it will be possible to manufacture a wet rubber masterbatch in which the degree to which carbon black is dispersed is extremely high, and for which there is further improvement in rubber strength, endurance capability, and ability to achieve reduced heat generation when vulcanized.

A slurry solution containing the foregoing carbon black and the foregoing dispersion solvent may be obtained by a method in which the foregoing carbon black is dispersed in the foregoing dispersion solvent, it being possible to cite as examples of said method any of various methods in which carbon black is dispersed through use of a high-shear mixer, high shear mixer, homomixer, ball mill, bead mill, high-pressure homogenizer, ultrasonic homogenizer, colloid mill, or other such ordinary disperser. Where necessary, the entire mixing system comprising disperser(s) and/or the like may be heated at the time that mixing is carried out.

The foregoing "high-shear mixer" refers to a mixer which is provided with rotor(s) and stator(s) and in which there is action of high shear due to rotation of rotor(s) under conditions in which there is precise clearance between stationary stator(s) and rotor(s) capable of rotating at high speed. As such high-shear mixer, commercially available devices may be employed, it being possible to cite the high shear mixers manufactured by the Silverson company; the IKA 2000 series of high shear mixers manufactured by the IKA company; the T.K. Homo Mixer manufactured by Tokushu Kika Kogyo Co., Ltd.; the Ultra Homo Mixer manufactured by Mizuho Industrial Co., Ltd.; the Clearmix manufactured by M Technique Co., Ltd.; the Cavitron manufactured by Pacific Machinery & Engineering Co., Ltd.; and so forth as examples.

By causing the slurry solution containing the foregoing carbon black and the foregoing dispersion solvent to be mixed in the presence of the foregoing rubber latex solution, it is possible to manufacture a carbon-black-containing rubber latex solution. As the mixing method, methods similar to the aforementioned methods for mixing carbon black and dispersion solvent may be cited. Where necessary, the entire mixing system comprising disperser(s) and/or the like may be heated at the time that mixing is carried out. Based upon considerations of the dewatering time and effort that would be involved during the heating operation, described below, it is preferred in specific terms that the concentration of rubber solids in the foregoing rubber latex solution be on the order of 10 wt % to 60 wt %, and more preferred that this be on the order of 20 wt % to 30 wt %. Furthermore, it is preferred that the concentration of the foregoing carbon black in the slurry solution containing the foregoing carbon black and the foregoing dispersion solvent be on the order of 1 wt % to 20 wt %.

Furthermore, when the carbon black is being dispersed within the dispersion solvent, it is also possible to add at least a portion of the rubber latex solution to manufacture a slurry solution containing carbon black to which rubber latex particles adhere, and to thereafter mix the slurry solution containing carbon black to which rubber latex particles adhere that was so obtained with what remains of the natural rubber latex solution to manufacture a rubber latex solution containing carbon black to which natural rubber latex adheres. By way of example, the amount used of the at least a portion of the rubber latex solution might be 0.05 wt % to 20 wt % of the total amount of rubber latex solution used. Furthermore, it is preferred that the amount used of the at least a portion of the rubber latex solution be such that the amount of rubber solids in the rubber latex solution which is added when expressed as a wt % ratio with respect to carbon black is 0.25% to 15%, and preferred that this be 0.5% to 10%. Furthermore, it is preferred that the concentration of the at least a portion of the rubber latex solution be 0.1 wt % to 5 wt %, and more preferred that this be 0.5 wt % to 2 wt %.

By coagulating the foregoing carbon-black-containing rubber latex solution, it is possible to manufacture a carbon-black-containing rubber coagulum. As the coagulation method, methods in which coagulant is made to be present within the carbon-black-containing rubber latex solution may be cited as examples. As the coagulant, it is possible to employ sodium chloride and/or other such salt(s), and/or formic acid, sulfuric acid, and/or other such acid(s), such as are ordinarily used for coagulation of rubber latex solution.

It is preferred that filler be present in the foregoing filler-containing rubber coagulum in an amount that is 10 parts by weight to 110 parts by weight for every 100 parts by weight of the rubber component. Where this is the case, it will be possible to ultimately manufacture a wet rubber masterbatch in which the degree to which filler is dispersed, and for which the endurance capability and ability to achieve reduced heat generation when made into vulcanized rubber, are improved in well-balanced fashion.

Heating Operation

A heating operation in accordance with the present invention employs a single-screw extruder to carry out dewatering, drying, and plasticization of the foregoing filler-containing rubber coagulum in a single operation.

Single-Screw Extruder

A single-screw extruder in accordance with the present invention has a dewatering portion toward a side thereof from which the foregoing filler-containing rubber coagulum is fed, a drying portion toward a side thereof from which the foregoing filler-containing rubber coagulum is discharged, and a screw that passes through said dewatering portion and said drying portion; the foregoing screw has a plurality of peaks and a plurality of troughs; the foregoing dewatering portion has an inside wall that faces the foregoing screw; and the single-screw extruder is equipped with barrel(s) that house the foregoing screw. As such single-screw extruder, single-screw extruders and interiors thereof such as are shown in schematic fashion at FIG. 1 and FIG. 2 may be cited as examples. The foregoing method for manufacturing wet rubber masterbatch is for convenience described below in terms of the example of the single-screw extruder and the interior thereof that are shown in FIG. 1 and FIG. 2.

Single-screw extruder 20 has screw 23, and barrels 27 comprising first barrel 25 which is located toward feed port 29 (at the upstream side), and second barrel 26 which is located toward discharge port 30 (at the downstream side), the filler-containing rubber coagulum which is obtained following the coagulation operation being fed thereinto by way of feed port 29, being subjected to kneading as it proceeds along a direction 1 which is the long direction of the barrels (the direction of the screw axis), and ultimately being discharged therefrom by way of discharge port 30. The upstream region is also referred to as dewatering portion 21, and the downstream region is also referred to as drying portion 22. Jacket 28 may be provided as necessary at drying portion 22 for temperature control. With respect to the lengths (L) and diameters (D) of the barrels of such single-screw extruder, any desired single-screw extruder such as is ordinarily used in the rubber industry may be employed, and it is also possible to employ any desired ratios (L/D) between barrel lengths and barrel diameters.

Inside wall(s) of barrels 27 may have slit(s) 24 extending along barrel length direction 1. By way of example, the width(s) of slit(s) 24 might be 0.1 mm to 2.0 mm. Slit(s) 24 may extend in continuous and/or intermittent fashion along barrel length direction 1. Furthermore, as slit(s) 24 formed at barrel inside wall(s), these may be formed such that slit width remains constant, and/or may be formed such that slit width decreases, as one proceeds in the slit depth direction from the barrel inside wall. Furthermore, at least a portion of the barrel inside wall(s) may have been subjected to shot/sand blasting. As the shot/sand blasting method, while there is no particular limitation with respect thereto, physical abrasion (shot/sand blasting), chemical abrasion (chemical corrosion), and/or the like may be employed.

Figure 2:
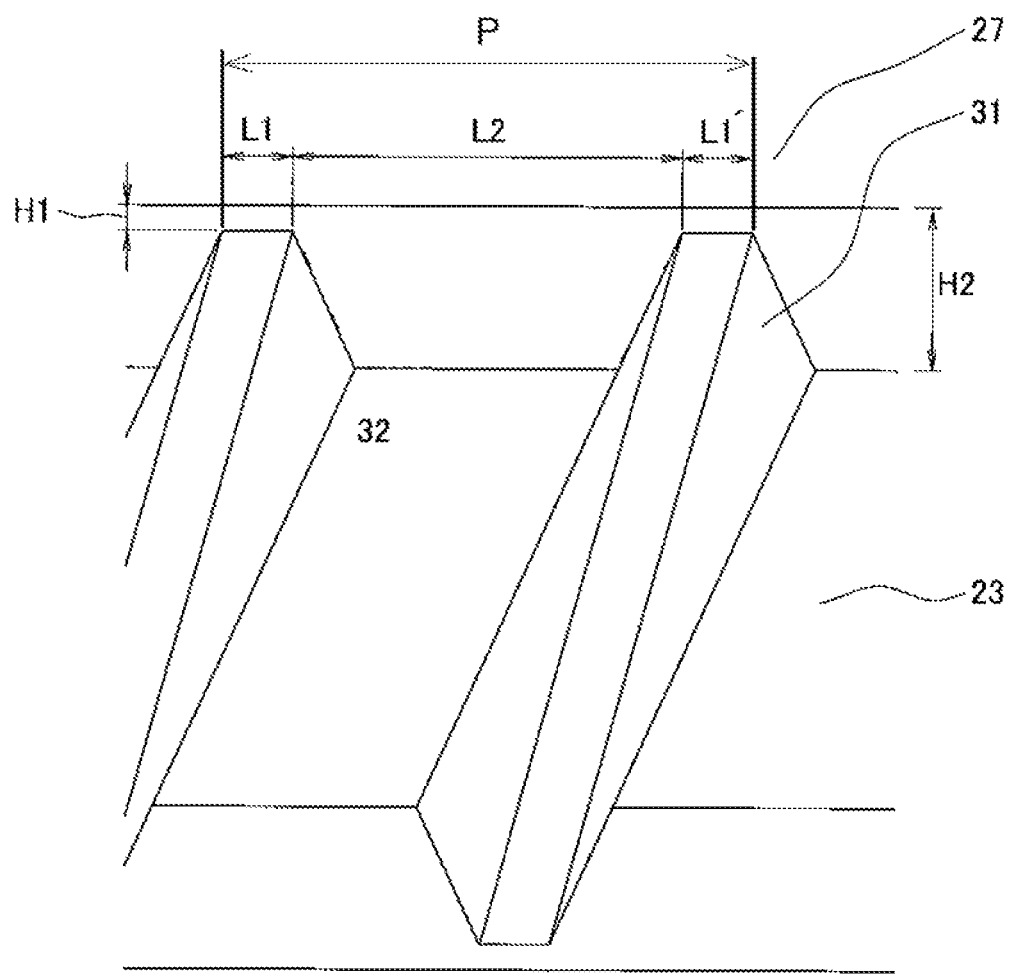
FIG. 2 Exemplary drawing to assist in describing the interior of a single-screw extruder.

FIG. 2 shows an exemplary drawing to assist in describing the interior of a single-screw extruder capable of being used in accordance with the present invention. Screw 23 provided at single-screw extruder 20 has a plurality of peaks 31 and a plurality of troughs 32. Furthermore, the interior of single-screw extruder has clearance H1 from the apex of peak 31 of screw 23 to inside the wall of barrel 27, and has clearance H2 from the base of trough 32 of screw 23 to the inside wall of barrel 27. Furthermore, in the barrel length direction at the interior of single-screw extruder, one pitch length P (=L1+L1'+L2) is the total of lengths (widths) L1 and L1' of peaks 31 and length L2 of the trough 32 that is located between the mutually adjacent peaks. By way of example, the foregoing clearance H1 might be 0.1 mm to 10 mm, and the foregoing clearance H2 might be 1 mm to 90 mm. By way of example, length L2 of the foregoing trough 32 might be 20 mm to 470 mm. Furthermore, by way of example, pitch P might be 25 mm to 500 mm.

A method for manufacturing wet rubber masterbatch in accordance with the present invention satisfies the conditions indicated by General Formula (1): $0.02 \leq C/(A \times B) \leq 0.15$ (at General Formula (1), A indicates, for a portion of the screw which is located at the foregoing dewatering portion, the pitch volume ($mm^3$) which is the volume swept by a region corresponding to one pitch length from the downstream-most peak in the direction in which the foregoing filler-containing rubber coagulum is extruded to the peak that is adjacent to said downstream-most peak, and the clearance from the base of the trough of the foregoing screw which is present at said region corresponding to one pitch length to the foregoing inside wall of the foregoing barrel, during one rotation of the foregoing screw; B indicates the rotational speed (rpm) of the foregoing screw; and C indicates feed volume per minute ($mm^3$/min) of the foregoing filler-containing rubber coagulum which is fed into the foregoing single-screw extruder). By thus causing the volume of a space present at the region corresponding to one pitch length which is located downstream-most in the direction in which said rubber coagulum is extruded at a portion of a screw which is located at a dewatering portion and the amount of the foregoing filler-containing rubber coagulum which is fed thereinto to be in a prescribed relationship, said method for manufacturing wet rubber masterbatch makes it possible to obtain a wet rubber masterbatch that permits attainment of vulcanized rubber having excellent antiscorching characteristics and reduced heat generation. Note that, in specific terms, the foregoing pitch volume indicates the volume of the space present at the foregoing L2 and the foregoing H2, and the volume of the space present at the foregoing L1 (and L1') and the foregoing H1.

From the standpoint of ability to impart appropriate shear force to the filler-containing rubber coagulum, it is preferred that the rotational speed (rpm) of the foregoing screw be not less than 2 rpm but not greater than 35 rpm, and more preferred that this be not less than 5 rpm but not greater than 30 rpm.

From the standpoint of reducing the water content of the filler-containing rubber coagulum and the standpoint of preventing deterioration of rubber, it is preferred that the heating temperature at the dewatering portion at the foregoing single-screw extruder be not less than 100° C. but not greater than 250° C., and more preferred that this be not less than 140° C. but not greater than 200° C. Furthermore, from the standpoint of reducing the water content of the filler-containing rubber coagulum and the standpoint of preventing deterioration of rubber, it is preferred that the heating temperature at the drying portion at the foregoing single-screw extruder be not less than 100° C. but not greater than 270° C., and more preferred that this be not less than 140° C. but not greater than 230° C.

From the standpoint of preventing deterioration of rubber due to excessive heat at the dewatering portion and the standpoint of increasing the efficiency of drying at the drying portion, it is preferred that the temperature of the foregoing filler-containing rubber coagulum immediately before it is extruded from the foregoing dewatering portion to the foregoing drying portion be not less than 50° C. but not greater than 110° C. From the standpoint of increasing the efficiency of drying at the drying portion, it is more preferred that the temperature of the foregoing filler-containing rubber coagulum immediately before it is extruded from the foregoing dewatering portion to the foregoing drying portion be not less than 60° C., and still more preferred that this be not less than 70° C.

From the standpoint of manufacturing the rubber composition which is described below, it is preferred that the water content of the wet rubber masterbatch obtained following the foregoing heating operation be not greater than 3 wt %, and more preferred that this be not greater than 2 wt %. Furthermore, from the standpoint of preventing deterioration of rubber due to excessive heat at the drying portion, it is preferred that the water content of the wet rubber masterbatch obtained following the foregoing heating operation be not less than 0.1 wt %, and more preferred that this be not less than 0.2 wt %.

At a method for manufacturing wet rubber masterbatch in accordance with the present invention, following the foregoing heating operation, the wet rubber masterbatch obtained above may be used to carry out a dry-mixing operation to manufacture a rubber composition.

At the foregoing dry-mixing operation, any of various compounding ingredients may be employed. As compounding ingredients capable of being employed, rubber, sulfur-type vulcanizing agent, vulcanization accelerator, antioxidant, silica, silane coupling agent, zinc oxide, methylene receptor(s) and/or methylene donor(s), stearic acid, vulcanization accelerator activator, vulcanization retarder, organic peroxide, wax and/or oil and/or or other such softener(s), processing additives, and/or other such compounding ingredients ordinarily used in the rubber industry may be cited as examples. Note that any of various compounding ingredients may also be employed as necessary when manufacturing the foregoing wet rubber masterbatch.

The foregoing rubber which may be employed is in addition to any rubber component originating from the foregoing wet rubber masterbatch. As the foregoing rubber, natural rubber (NR), isoprene rubber (IR), styrene-butadiene rubber (SBR), butadiene rubber (BR), chloroprene rubber (CR), nitrile rubber (NBR), and other such synthetic diene-type rubbers may be cited as examples. Any one rubber may be used alone, or two or more varieties thereof may be employed in combination.

It is sufficient that the vulcanizing agent be vulcanizing agent ordinarily used for rubber, sulfur-type vulcanizing agent being preferred. As the sulfur in the foregoing sulfur-type vulcanizing agent, it being sufficient that this be sulfur as is ordinarily used for rubber, it is possible, for example, to use powdered sulfur, precipitated sulfur, insoluble sulfur, high dispersing sulfur, and/or the like. Any one vulcanizing agent may be used alone, or two or more varieties thereof may be employed in combination.

It is preferred that the amount of the foregoing vulcanizing agent present therein be 0.5 part by weight to 10 parts by weight, and more preferred that this be 1 part by weight to 5 parts by weight, for every 100 parts by weight of rubber component within the rubber composition.

As the foregoing vulcanization accelerator, it being sufficient that this be vulcanization accelerator as is ordinarily used for rubber, sulfenamide-type vulcanization accelerator, thiuram-type vulcanization accelerator, thiazole-type vulcanization accelerator, thiourea-type vulcanization accelerator, guanidine-type vulcanization accelerator, dithiocarbamate-type vulcanization accelerator, and so forth may be cited as examples. Any one vulcanization accelerator may be used alone, or two or more varieties thereof may be employed in combination.

It is preferred that the amount of the foregoing vulcanization accelerator present therein be 0.5 part by weight to 5 parts by weight, and more preferred that this be 1 part by weight to 3 parts by weight, for every 100 parts by weight of rubber component within the rubber composition.

As the foregoing antioxidant, it being sufficient that this be antioxidant as is ordinarily used for rubber, aromatic-amine-type antioxidants, amine-ketone-type antioxidants, monophenol-type antioxidants, bisphenol-type antioxidants, polyphenol-type antioxidants, dithiocarbamate-type antioxidants, thiourea-type antioxidants, and so forth may be cited as examples. Any one antioxidant may be used alone, or two or more varieties thereof may be employed in combination.

It is preferred that the amount of the foregoing antioxidant present therein be 1 part by weight to 5 parts by weight for every 100 parts by weight of rubber component within the rubber composition.

As method for blending (adding) the foregoing various compounding ingredients and the foregoing wet rubber masterbatch, methods in which an intermeshing Banbury mixer, tangential Banbury mixer, kneader, roller, and/or other such kneader such as is ordinarily used in the rubber industry is used to carry out kneading may be cited as examples.

While there is no particular limitation with respect to the foregoing kneading method, methods in which components other than sulfur-type vulcanizing agent, vulcanization accelerator, and other such vulcanization-type components are added in any desired order and are kneaded; methods in which these are added simultaneously and are kneaded; methods in which all components are simultaneously added and are kneaded; and so forth may be cited as examples. Furthermore, kneading may be carried out once or may be carried out multiple times. While kneading time will vary depending on the size and so forth of the kneader used, it is ordinarily sufficient that this be on the order of 2 minutes to 5 minutes. Furthermore, it is preferred that discharge temperature of the kneader be 120° C. to 170° C., and more preferred that this be 120° C. to 150° C. But where the foregoing vulcanization-type component(s) are included, note that it is preferred that discharge temperature of the kneader be 80° C. to 110° C., and more preferred that this be 80° C. to 100° C.

A method for manufacturing wet rubber masterbatch in accordance with the present invention will make it possible to obtain a wet rubber masterbatch that permits attainment of vulcanized rubber having excellent antiscorching characteristics and reduced heat generation. Furthermore, a rubber composition employing a wet rubber masterbatch in accordance with the present invention is suitable for a pneumatic tire.

WORKING EXAMPLES

Although the present invention is described below in terms of working examples, it should be understood that the present invention is not to be limited in any way by these working examples.

Raw Materials Employed
a) Natural rubber latex solution: "NR Field Latex" (manufactured by Golden Hope) (DRC=31.2%)
b) Carbon black: "SEAST 9H (N134)" (manufactured by Tokai Carbon Co., Ltd.)
c) Carbon black: "SEAST 7HM (N234)" (manufactured by Tokai Carbon Co., Ltd.)
d) Carbon black: "SEAST KH (N339)" (manufactured by Tokai Carbon Co., Ltd.)
e) Carbon black: "SEAST SO (N550)" (manufactured by Tokai Carbon Co., Ltd.)
f) Carbon black: "SEAST S (N774)" (manufactured by Tokai Carbon Co., Ltd.)
g) Synthetic rubber: "UBEPOL BR150L" (manufactured by Ube Industries, Ltd.)
h) Zinc oxide: "Zinc Oxide No. 1" (manufactured by Mitsui Mining & Smelting Co., Ltd.)
i) Stearic acid: "LUNAC S-20" (manufactured by Kao Corporation)
j) Wax: "OZOACE 0355" (manufactured by Nippon Seiro Co., Ltd.)
k) Antioxidant (A): N-phenyl-N'-(1,3-dimethylbutyl)-p-phenylenediamine; "NOCRAC 6C" (manufactured by Ouchi Shinko Chemical Industrial Co., Ltd.)
l) Antioxidant (B): 2,2,4-trimethyl-1,2-dihydroquinoline polymer; "NOCRAC 224" (manufactured by Ouchi Shinko Chemical Industrial Co., Ltd.)
m) Sulfur: "5% Oil Treated Sulfur Powder" (manufactured by Tsurumi Chemical Industry Co., Ltd.)
n) Vulcanization accelerator: N-cyclohexyl-2-benzothiazolesulfenamide; "Sanceler CM" (manufactured by Sanshin Chemical Industry Co., Ltd.)

Working Example 1

Manufacture of Wet Rubber Masterbatch
Operation in which Filler-Containing Rubber Coagulum is Manufactured Water was added to natural rubber latex solution to prepare an aqueous rubber latex solution having a concentration that was 25 wt %. Furthermore, "SEAST 7HM (N234)" carbon black was added to water, and a ROBO MIX manufactured by PRIMIX Corporation was used on this to disperse the carbon black (conditions at said ROBO MIX: 9000 rpm; 30 min) to manufacture a slurry solution containing carbon black having a concentration of 5 wt %. Next, to the slurry solution containing carbon black that was obtained, the foregoing aqueous rubber latex solution was added in an amount sufficient to produce 45 parts by weight of carbon black per 100 parts by weight of rubber component, and an SM-L56 mixer for household use manufactured by SANYO was used to carry out mixing (mixer conditions: 11300 rpm; 30 min) to manufacture a carbon-black-containing rubber latex solution.

While using the foregoing SM-L56 mixer for household use manufactured by SANYO to carry out mixing, coagulant in the form of formic acid (10% solution) was then added to the carbon-black-containing rubber latex solution in an amount sufficient to cause the entire solution to attain a pH of 4 to manufacture a filler-containing rubber coagulum in the form of a carbon-black-containing natural rubber coagulum.

Heating Operation

The squeezer-type single-screw extruder shown in FIG. 1 and FIG. 2 [(manufactured by Suehiro EPM Corporation; Model V-02); barrel diameter 90 mm; (barrel length)/(barrel diameter)=(L/D)=8.6; slit width at inside wall of barrel 27 (slit width=0.9 mm at locations upstream in direction of screw axis; slit width=0.7 mm at locations downstream in direction of screw axis); screw rotational speed 8 rpm] was used, being set to a state such that heating temperature was 180° C. (180° C. heating temperature at heated screw and jacket), the carbon-black-containing natural rubber coagulum obtained above being fed into the single-screw extruder, with dewatering, drying, and plasticization being carried out in a single operation while kneading was carried out in such fashion as to cause C/(A×B) at the foregoing General Formula (1) to be 0.07, to manufacture a wet rubber masterbatch. Furthermore, temperature of the carbon-black-containing natural rubber coagulum immediately before it was extruded from the dewatering portion to the drying portion was 95° C., and water content of the wet rubber masterbatch that was obtained was 1.1 wt %. Measurement of the temperature of the foregoing filler-containing rubber coagulum immediately before it was extruded from the foregoing dewatering portion to the foregoing drying portion was carried out by inserting a temperature detector through a slit located at the downstream-most point in the dewatering portion.

Note that the foregoing C (feed volume per minute (mm³/min) of the foregoing filler-containing rubber coagulum which is fed into the foregoing single-screw extruder) is the feed volume calculatable based on weight when it is assumed that the water content of the filler-containing rubber coagulum is 0 wt %. Furthermore, specific gravity of the filler-containing rubber coagulum when it is assumed that said water content is 0 wt % is defined to be 1.0 g/cm³. For example, the feed volume when 100 parts by weight of filler-containing rubber coagulum having a water content of 20 wt % is fed thereinto for one minute will be 80 mm³/min [={100×(1−0.2)}/1.0].

Water content of the foregoing filler-containing rubber coagulum and of the foregoing wet rubber masterbatch are measured in accordance with JIS K 6238-2 using an MX-50 heating-and-drying-type moisture analyzer manufactured by A&D Company, Limited.

Manufacture of Rubber Composition and Unvulcanized Rubber Composition

A Banbury mixer was used to dry-mix (kneading time=3 min; discharge temperature=150° C.) the wet rubber masterbatch obtained above and the respective raw materials (components except sulfur and vulcanization accelerator) indicated at TABLE 1 to manufacture a rubber composition. The sulfur and vulcanization accelerator indicated at TABLE 1 were then added to the rubber composition that was obtained, and a Banbury mixer was used to carry out dry-mixing (kneading time=1 min; discharge temperature=90° C.) to manufacture an unvulcanized rubber composition. Note that the blending ratios in TABLE 1 are expressed as parts by weight (phr) when the total amount of the rubber component contained in the rubber composition is taken to be 100 parts by weight.

Working Examples 2-10 and 12-16; Comparative Examples 1-7

At the respective Working Examples and the respective Comparative Examples, except for the fact that the value of C/(A×B) at General Formula (1), the rotational speed of the screw, the temperature at the dewatering portion, and the raw materials and amounts thereof that were used were varied as indicated at TABLE 1 and TABLE 2, a method similar to that employed at Working Example 1 was used to manufacture the wet rubber masterbatches, rubber compositions, and unvulcanized rubber compositions of Working Examples 2 through 10 and 12 through 16, and Comparative Examples 1 through 7.

Embodiment 11

Except for the fact that a portion of the rubber latex solution was added during the operation at Working Example 1 in which carbon black was dispersed in water, and the remainder of the aqueous rubber latex solution was added during the operation at Working Example 1 in which the slurry solution containing carbon black was mixed in the presence of aqueous rubber latex solution, a method similar to that employed at Working Example 1 was used to manufacture a wet rubber masterbatch, rubber composition, and unvulcanized rubber composition. At the operation in which carbon black was dispersed in water, note that aqueous rubber latex solution was added in an amount that was 0.5 wt % of the total amount of rubber latex solution used.

Evaluation of the unvulcanized rubber compositions obtained at the foregoing Working Examples and Comparative Examples was carried out as follows. Results of evaluation are shown in TABLE 1 and TABLE 2.

Evaluation of Antiscorching Characteristics

Evaluation of antiscorching characteristics was carried out in accordance with JIS K 6300 using a rotorless Mooney measurement apparatus manufactured by Toyo Seiki Seisaku-sho, Ltd., the unvulcanized rubber compositions being preheated at 125° C. for 1 minute, following which the time t5 required for an increase of 5 Mooney units from minimum viscosity Vm was measured, this being shown for Working Examples 1 through 11 as indexed relative to a value of 100 for Comparative Example 1, this being shown for Working Example 12 as indexed relative to a value of 100 for Comparative Example 3, this being shown for Working Example 13 as indexed relative to a value of 100 for Comparative Example 4, this being shown for Working Example 14 as indexed relative to a value of 100 for Comparative Example 5, this being shown for Working Example 15 as indexed relative to a value of 100 for Comparative Example 6, and this being shown for Working Example 16 as indexed relative to a value of 100 for Comparative Example 7. This means that the larger the index the longer the scorch time and the more excellent the antiscorching characteristics. Note that evaluation of Comparative Example 2 was not carried out because a rubber composition could not be manufactured due to the fact that water content of the wet rubber masterbatch was too high (4.3 wt %).

Manufacture of Vulcanized Rubber

The unvulcanized rubber compositions obtained at the foregoing Working Examples and Comparative Examples were vulcanized at conditions of 150° C. for 30 min to manufacture vulcanized rubber. Evaluation of the vulcanized rubber obtained was carried out as follows. Results of evaluation are shown in TABLE 1 and TABLE 2.

Evaluation of Heat Generation

Evaluation of heat generation was carried out in accordance with JIS K 6394 using a viscoelasticity testing machine manufactured by Toyo Seiki Seisaku-sho, Ltd., to measure the loss factor tan δ under conditions of frequency 10 Hz, 10% static strain, 1% dynamic strain, and temperature 60° C., this being shown for Working Examples 1 through 11 as indexed relative to a value of 100 for Comparative Example 1, this being shown for Working Example 12 as indexed relative to a value of 100 for Comparative Example 3, this being shown for Working Example 13 as indexed relative to a value of 100 for Comparative Example 4, this being shown for Working Example 14 as indexed relative to a value of 100 for Comparative Example 5, this being shown for Working Example 15 as indexed relative to a value of 100 for Comparative Example 6, and this being shown for Working Example 16 as indexed relative to a value of 100 for Comparative Example 7. This indicates that the lower the index the less the tendency for heat generation to occur and the more excellent in terms of ability to achieve reduced heat generation. Note that evaluation of Comparative Example 2 was not carried out because a rubber composition could not be manufactured due to the fact that water content of the wet rubber masterbatch was too high (4.3 wt %).

TABLE 1

| | | Comparative Example 1 | Comparative Example 2 | Working Example 1 | Working Example 2 | Working Example 3 | Working Example 4 | Working Example 5 | Working Example 6 | Working Example 7 | Working Example 8 | Working Example 9 | Working Example 10 | Working Example 11 |
|---|---|---|---|---|---|---|---|---|---|---|---|---|---|---|
| Wet rubber masterbatch components | Natural rubber (solids content) | 100 | 100 | 100 | 100 | 100 | 100 | 100 | 100 | 100 | 100 | 100 | 100 | 100 |
| | Carbon black N134 | | | | | | | | | | | | | |
| | N234 | 45 | 45 | 45 | 45 | 45 | 45 | 45 | 45 | 45 | 45 | 45 | 45 | 45 |
| | N339 | | | | | | | | | | | | | |
| | N550 | | | | | | | | | | | | | |
| | N774 | | | | | | | | | | | | | |
| Dewatering portion | Screw rotational speed (rpm) | 16 | 16 | 8 | 12 | 16 | 20 | 24 | 16 | 16 | 16 | 16 | 16 | 16 |
| | C/(A × B) at General Formula (1) | 0.014 | 0.19 | 0.07 | 0.093 | 0.07 | 0.084 | 0.07 | 0.035 | 0.11 | 0.14 | 0.07 | 0.07 | 0.07 |
| | Dewatering portion temperature (° C.) | 180 | 180 | 180 | 180 | 180 | 180 | 180 | 180 | 180 | 180 | 160 | 200 | 180 |
| | Temperature of filler-containing rubber coagulum immediately before being extruded to drying portion (° C.) | 127 | 77 | 95 | 94 | 96 | 98 | 88 | 105 | 85 | 82 | 88 | 106 | 95 |
| Rubber composition components (components other than wet rubber masterbatch) | Synthetic rubber (solids content) | | | | | | | | | | | | | |
| | Zinc oxide | 3 | 3 | 3 | 3 | 3 | 3 | 3 | 3 | 3 | 3 | 3 | 3 | 3 |
| | Stearic acid | 2 | 2 | 2 | 2 | 2 | 2 | 2 | 2 | 2 | 2 | 2 | 2 | 2 |
| | Wax | 1 | 1 | 1 | 1 | 1 | 1 | 1 | 1 | 1 | 1 | 1 | 1 | 1 |
| | Antioxidant (A) | 2 | 2 | 2 | 2 | 2 | 2 | 2 | 2 | 2 | 2 | 2 | 2 | 2 |
| | Antioxidant (B) | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 |
| | Vulcanization accelerator | 1 | 1 | 1 | 1 | 1 | 1 | 1 | 1 | 1 | 1 | 1 | 1 | 1 |
| Evaluation | Wet rubber masterbatch water content (wt %) | 0.2 | 4.3 | 1.1 | 1 | 0.8 | 0.5 | 1.4 | 0.4 | 1.5 | 1.8 | 1.4 | 0.3 | 0.9 |
| | Antiscorching characteristics | 100 | — | 120 | 121 | 129 | 118 | 115 | 107 | 113 | 108 | 112 | 126 | 129 |
| | Heat generation | 100 | — | 95 | 95 | 93 | 92 | 91 | 95 | 91 | 90 | 88 | 95 | 91 |

TABLE 2

|  |  | Comparative Example 3 | Working Example 12 | Comparative Example 4 | Working Example 13 | Comparative Example 5 | Working Example 14 | Comparative Example 6 | Working Example 15 | Comparative Example 7 | Working Example 16 |
|---|---|---|---|---|---|---|---|---|---|---|---|
| Wet rubber masterbatch components | Natural rubber (solids content) | 100 | 100 | 100 | 100 | 100 | 100 | 100 | 100 | 80 | 80 |
|  | Carbon black N134 | 45 | 45 |  |  |  |  |  |  | 45 | 45 |
|  | N234 |  |  |  |  |  |  |  |  |  |  |
|  | N339 |  |  | 50 | 50 |  |  |  |  |  |  |
|  | N550 |  |  |  |  | 60 | 60 |  |  |  |  |
|  | N774 |  |  |  |  |  |  | 70 | 70 |  |  |
| Dewatering portion | Screw rotational speed (rpm) | 16 | 16 | 16 | 16 | 16 | 16 | 16 | 16 | 16 | 16 |
|  | C/(A × B) at General Formula (1) | 0.017 | 0.07 | 0.017 | 0.07 | 0.017 | 0.07 | 0.017 | 0.07 | 0.017 | 0.07 |
|  | Dewatering portion temperature (° C.) | 180 | 180 | 180 | 180 | 180 | 180 | 180 | 180 | 180 | 180 |
|  | Temperature of filler-containing rubber coagulum immediately before being extruded to drying portion (° C.) | 135 | 101 | 124 | 95 | 120 | 89 | 115 | 83 | 141 | 104 |
| Rubber composition components (components other than wet rubber masterbatch) | Synthetic rubber (solids content) |  |  |  |  |  |  |  |  | 20 | 20 |
|  | Zinc oxide | 3 | 3 | 3 | 3 | 3 | 3 | 3 | 3 | 3 | 3 |
|  | Stearic acid | 2 | 2 | 2 | 2 | 2 | 2 | 2 | 2 | 2 | 2 |
|  | Wax | 1 | 1 | 1 | 1 | 1 | 1 | 1 | 1 | 1 | 1 |
|  | Antioxidant (A) | 2 | 2 | 2 | 2 | 2 | 2 | 2 | 2 | 2 | 2 |
|  | Antioxidant (B) | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 |
|  | Vulcanization accelerator | 1 | 1 | 1 | 1 | 1 | 1 | 1 | 1 | 1 | 1 |
| Evaluation | Wet rubber masterbatch water content (wt %) | 0.2 | 0.4 | 0.2 | 0.8 | 0.4 | 0.9 | 0.5 | 1.1 | 0.1 | 0.3 |
|  | Antiscorching characteristics | 100 | 114 | 100 | 120 | 100 | 118 | 100 | 119 | 100 | 112 |
|  | Heat generation | 100 | 94 | 100 | 95 | 100 | 95 | 100 | 96 | 100 | 93 |

The invention claimed is:

1. A method for manufacturing wet rubber masterbatch obtained from raw materials in the form of at least filler, dispersion solvent, and rubber latex solution, the method for manufacturing wet rubber masterbatch comprising:
an operation in which the rubber latex solution is mixed and coagulated with a slurry solution containing the filler and the dispersion solvent to manufacture a filler-containing rubber coagulum; and
a heating operation in which a single-screw extruder is used to carry out dewatering, drying, and plasticization of the filler-containing rubber coagulum in a single operation;
wherein the single-screw extruder has a dewatering portion toward a side thereof from which the filler-containing rubber coagulum is fed, a drying portion toward a side thereof from which the filler-containing rubber coagulum is discharged, and a screw that passes through said dewatering portion and said drying portion;
wherein the screw has a plurality of peaks and a plurality of troughs;
wherein the dewatering portion has an inside wall that faces the screw, and is equipped with a barrel that houses the screw;
wherein the method for manufacturing wet rubber masterbatch is characterized in that it satisfies conditions indicated by General Formula (1);
wherein General Formula (1) is $0.02 \leq C/(A \times B) \leq 0.15$;
wherein A indicates, for a portion of the screw which is located at the dewatering portion, the pitch volume in units of $mm^3$ which is the volume swept by a region corresponding to one pitch length from the downstream-most peak in the direction in which the filler-containing rubber coagulum is extruded to the peak that is adjacent to said downstream-most peak, and the clearance from the base of the trough of the screw which is present at said region corresponding to one pitch length to the inside wall of the barrel, during one rotation of the screw;
wherein B indicates rotational speed in units of rpm of the screw; and
wherein C indicates feed volume per minute in units of $mm^3/min$ of the filler-containing rubber coagulum which is fed into the single-screw extruder,
wherein temperature of the filler-containing rubber coagulum immediately before it is extruded from the dewatering portion to the drying portion is not less than 50° C. but is not greater than 110° C.

* * * * *